Feb. 13, 1923.
A. W. GEIGER
1,445,308
PIN TUBE
Filed July 13, 1922
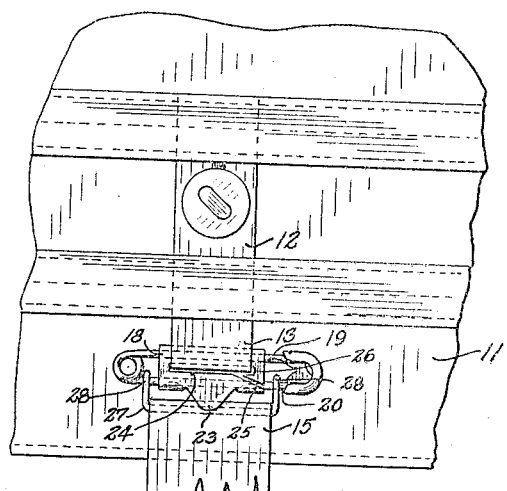
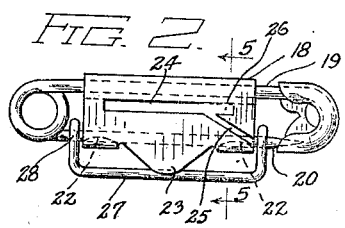
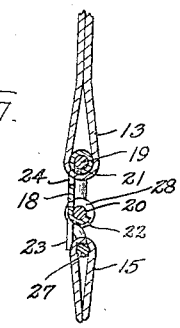
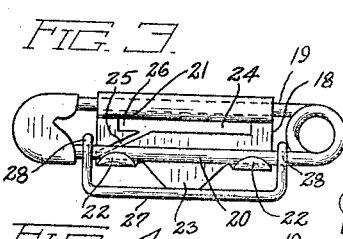
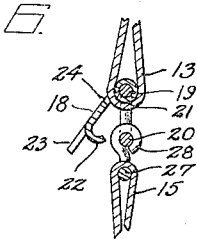
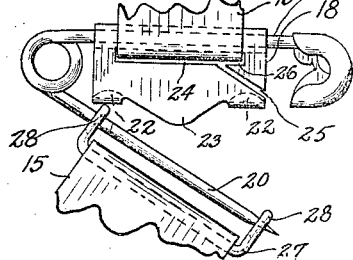
INVENTOR.
Albert W. Geiger
BY Wooster & Davis
ATTORNEYS.

Patented Feb. 13, 1923.

1,445,308

UNITED STATES PATENT OFFICE.

ALBERT W. GEIGER, OF STRATFORD, CONNECTICUT.

PIN TUBE.

Application filed July 13, 1922. Serial No. 574,743.

*To all whom it may concern:*

Be it known that I, ALBERT W. GEIGER, a citizen of the United States, residing at Stratford, county of Fairfield, State of Connecticut, have invented an Improvement in Pin Tubes, of which the following is a specification.

This invention relates to supporting means, especially hose supporting means and the like, and has for an object to provide improved means for securing hose supporters to waists, corsets, and similar garments.

It is also an object of the invention to provide such a connecting means which will not pull out under strain, which will be simple in construction and comparatively cheap and easy to manufacture.

It is a further object of the invention to provide means adapted for use in connection with a safety pin used for connecting hose supporters to waists and the like, which will transfer the strain across the pin without tending to open the same, and it is a still further object of the invention to provide a connecting means which may be threaded on the loop braids after the same have been sewed to the waist or other garment.

With these and other objects in view I have devised the construction illustrated in the accompanying drawing, in which Fig. 1 is a plan view of a portion of a waist and a hose supporter illustrating how my device is employed in suspending the supporter from the waist.

Fig. 2 is a top plan view of my device on an enlarged scale detached from the hose supporter and waist, the pin being in closed position.

Fig. 3 is a bottom plan view thereof.

Fig. 4 is a plan view showing the pin open.

Fig. 5 is a transverse section substantially on the line 5—5 of Fig. 2.

Fig. 6 is a similar view showing the bridge-member disengaged from the pin member.

The waist or other garment on which the hose supporter 10 is carried is represented at 11 having secured thereto in any suitable manner usually by stitching, braid 12 forming a loop 13. The hose supporter may be of the usual type having a loop 15 adjacent its upper end and hose grips 16 of any suitable or desired type with the usual adjusting buckle 17 therebetween. At the present time a common method of connecting the supporter to the waist is by passing the bar of a safety pin through one of the loops 13 and 15 and the pin-member through the other loop, either directly or with a metal tube on the bar around which the braid is looped. By this method all the strain from the supporter is put on the bar and pin-member of the pin tending to separate the same, and the bar or pin-member soon bend allowing the pin to open and the supporter to become detached. To obviate this difficulty I have provided means whereby the strain from the supporter is transmitted directly to the braid 12 with no tendency whatever to open the pin.

This means comprises a bridge-member 18 preferably constructed as shown of a single piece of sheet metal. This bridge-member is either pivoted to bar 19 of the pin or to pin-member 20 but is preferably hinged to the bar as shown. It may be hinged to the bar in different ways but I prefer to wrap one edge 21 thereof loosely about the bar 19. The bridge-member is provided adjacent its opposite edge with laterally curved hooked lugs 22 adapted to extend around the outer side of the pin-member and snap over the same as shown in Figs. 2, 3, and 5, and between these lugs I provide a tongue 23 to facilitate opening and closing of the bridge-member. The bridge-member is provided with an opening 24, preferably a slot, for passage of the braid 12 on which it is threaded. I preferably locate this slot so that it is between the bar and pin-member when the device is closed but if desired it may be located outside the bar and produce the same effect. I also preferably provide the bridge-member with a laterally extending slot 25 leading from an edge of the bridge-member to the slot 24 so that the bridge-member may be threaded on the braid 12 after the same has been stitched to the waist. This slot may, however, if desired be omitted in which case the bridge-member would be threaded on the braid before the braid is stitched to the garment. By having the slot 25 extend into the slot 24 intermediate the ends thereof the slot 24 will extend beyond the entrance to the slot 25 as shown at 26 into which one edge of the braid will extend and thus there will be no liability of this edge of the braid accidentally entering the slot 25 and allowing the bridge-member to become detached therefrom.

The hose supporter is secured to the pin by means of a supporting element 27 preferably made of wire bent substantially U-shape as shown and having its free ends bent to form eyes 28 to receive the pin-member 20.

The operation is as follows:

The bridge-member 18 pivoted on the bar 19 is threaded on the braid 12 either by passing the braid through the slot 24 before it is stitched to the garment or after it is stitched by passing it through the lateral slot 25 as described above. The supporting element 27 is then placed on the pin-member 20 as shown in Fig. 4 and the member moved to closed position. The free edge of the bridge-member is then pressed toward the pin-member snapping the free ends of the lugs 22 over the pin-member as shown in Figs. 1, 2, 3, and 5, the resiliency of the bar 19 and pin-member 20 allowing this action and securely holding it in closed position. It will now be apparent that the strain from the supporter transmitted to the pin-member 20 will be transmitted through the lugs 22 directly to the loop 13 of the braid 12 instead of through the bar 19 as in the old form and that there is, therefore, no tendency to separate the bar and pin-member with a resultant liability to opening of the pin. In other words the pin is practically relieved of the strain from the supporter. When it is desired to disconnect this supporter all that is necessary is to disconnect the lugs 22 from the pin-member 20 by raising the tongue 23 and then opening the pin in the usual manner.

Having thus described the nature of my invention, what I claim is:

1. In a device of the character described a safety pin having a bar and a pin member, a bridge-member adapted to connect the bar and pin-member and provided with an opening whereby it may be threaded on a braid or loop.

2. In a device of the character described a pin having a bar and a pin-member, a bridge-member pivoted to one of said elements and provided with means to detachably engaged the other element, said bridge-member being also provided with means whereby it may be threaded on a braid.

3. In a device of the character described a safety pin having a bar and a pin-member, a bridge-member pivoted to said bar and provided with means for detachably engaging the pin-member, said bridge-member being also provided with an opening whereby it may be threaded on a braid.

4. In a device of the character described a safety pin having a bar and a pin-member, a bridge-member pivoted to said bar and provided with hooked lugs adapted to engage over the outer side of the pin-member, said bridge-member being also provided with an opening whereby it may be threaded on a braid.

5. In a device of the character described a safety pin having a bar and a pin-member, a bridge-member pivoted to one of said elements and provided with means to detachably engage the other element, said bridge-member being also provided with an opening and a slot leading from an edge of the member to said opening whereby it may be threaded on a braid.

6. In a device of the character described a safety pin having a bar and a pin-member, a bridge-member pivoted to one of said elements and provided with means to detachably engage the other element, said bridge-member being also provided with an elongated opening or slot and a second slot leading from an edge of said member to the first mentioned slot intermediate the ends thereof whereby it may be threaded on a braid.

7. In a device of the character described a safety pin having a bar and a pin-member, a one piece sheet metal bridge-member embracing one of said elements whereby it is pivoted thereto and provided with hooked lugs bent therefrom to detachably engage the other element, said bridge-member being also provided with an opening whereby it may be threaded on a braid.

8. In a device of the character described a safety pin having a bar and a pin-member, a bridge-member pivoted to said bar and adapted to removably engage the pin-member, said bridge-member being also provided with an opening whereby it may be threaded on a braid, and a supporting element secured to said pin-member and adapted for threaded engagement with a braid.

In testimony whereof I affix my signature.

ALBERT W. GEIGER.